(12) United States Patent
Schmidlin

(10) Patent No.: US 6,499,831 B2
(45) Date of Patent: Dec. 31, 2002

(54) POWDER CONVEYING AND DISPENSING METHOD AND APPARATUS USING TRAVELING WAVE TRANSPORT

(75) Inventor: Fred W. Schmidlin, Pittsford, NY (US)

(73) Assignee: Technology Innovations LLC, West Henrietta, NY (US)

( * ) Notice: Subject to any disclaimer, the term of this patent is extended or adjusted under 35 U.S.C. 154(b) by 0 days.

(21) Appl. No.: 10/000,200

(22) Filed: Nov. 2, 2001

(65) Prior Publication Data

US 2002/0054190 A1 May 9, 2002

Related U.S. Application Data

(60) Provisional application No. 60/245,782, filed on Nov. 3, 2000.

(51) Int. Cl.[7] .................................................. B41J 2/06
(52) U.S. Cl. ...................................................... 347/55
(58) Field of Search .......................... 347/55, 151, 120, 347/141, 154, 103, 123, 111, 159, 127, 128, 131, 125, 158; 399/271, 290, 292, 293, 294, 295

(56) References Cited

U.S. PATENT DOCUMENTS

| | | |
|---|---|---|
| 4,062,443 A | 12/1977 | Wallace et al. |
| 4,647,179 A | 3/1987 | Schmidlin |
| 4,743,926 A | 5/1988 | Schmidlin et al. |
| 4,755,837 A | 7/1988 | Schmidlin et al. |
| 4,814,796 A | 3/1989 | Schmidlin |
| 4,876,561 A | 10/1989 | Schmidlin |
| 5,281,982 A | 1/1994 | Mosehauer et al. |
| 5,400,062 A | 3/1995 | Salmon |
| 5,541,716 A | 7/1996 | Schmidlin |
| 5,850,587 A | 12/1998 | Schmidlin |
| 6,161,921 A | 12/2000 | Bard et al. |

OTHER PUBLICATIONS

"Traveling Wave Transport of Conductive Toner Particles"; Ralph Kober; IS&T's NIP16: International Conference on Digital Printing Technologies.

Primary Examiner—Raquel Yvette Gordon
(74) Attorney, Agent, or Firm—Greenwald & Basch LLP; Duane C. Basch

(57) ABSTRACT

The present invention is a method and apparatus for traveling wave transport of charged particles, and more particularly to methods and apparatus for the loading, conveying and dispensing of particles for use in the preparation of pharmaceutical dosages as well as the monitoring and control thereof.

15 Claims, 6 Drawing Sheets

POWDER CONVEYING AND DISPENSING METHOD AND APPARATUS USING TRAVELING WAVE TRANSPORT

This application claims the benefit of provisional application No. 60/245,782 filed Nov. 3, 2000.

This invention relates generally to traveling wave transport of charged particles, and more particularly to methods and apparatus for the loading, conveying and dispensing of particles as well as the monitoring and control thereof.

CROSS REFERENCE

The following related patents and application are hereby incorporated by reference in their entirety for their teachings:

U.S. Pat. No. 4,647,179 to F. Schmidlin, issued Mar. 3, 1987, for "Development Apparatus";

U.S. Pat. No. 4,743,926 to F. Schmidlin, issued May 10, 1988, for "Direct Electrostatic Printing Apparatus and Toner/Developer Delivery System Therefor";

U.S. Pat. No. 5,541,716, to F. Schmidlin, issued Jul. 30, 1996, for "Electrostatic Toner Conditioning and Transport System";

U.S. Pat. No. 5,850,587 to F. Schmidlin, Issued Dec. 15, 1998, for "Electrostatic Toner Conditioning and Controlling Means"; and Co-pending U.S. application Ser. No. 09/188,458, filed Nov. 9, 1998 by F. Schmidlin, entitled "XeroJet—A New Dry Powder Printing Process".

BACKGROUND AND SUMMARY OF THE INVENTION

The present invention is related, in operation to the Dry Powder Printing Process, called XeroJet, described in co-pending application Ser. No. 09/188,458, and is based on the process of transporting dry powders using Electrostatic Traveling Waves and further includes means for confining the powder flow to narrow channels. The flow channels are preferably defined by "Barrier Electrodes" (BE), or "guide rails", aligned parallel to the direction of flow. Barrier electrodes, in the copending application, are made extremely narrow to facilitate the formation of narrow transport channels (40 to 90 microns wide) for printing high-resolution images, including uniform solid areas. The dry powder in the XeroJet printing process is comprised of toner particles containing pigments or dyes as colorants. Independent modulation of each channel is also required to print arbitrary images.

The only essential requirement of the medium in transport, however, is that it be comprised of dry powder particles possessing an electrostatic charge (Q). This charge and the electric field (E) of the traveling wave supplies the driving force that moves the powder. As will be appreciated, aspects of the previously incorporated U.S. Pat. Nos. 5,541, 716 and 5,850,587 patents are now recognized as having application to the conditioning and controlled conveyance of any chargeable dry powder. Accordingly, other powder-based applications may utilize a similar powder dispensing process, though significant benefits can ensue from application specific designs. This is illustrated herein via the design of a powder dispensing method and apparatus for use in applications pertaining to the preparation of pharmaceuticals.

Heretofore, a number of patents and publications have disclosed traveling wave transport for the transport of charged toner particles, the relevant portions of which may be briefly summarized as follows:

U.S. Pat. No. 4,647,179, issued Mar. 3, 1987, teaches a traveling wave transport for conveying toner from a supply to a development station where the toner is used to form images. FIGS. 3–5 illustrate electrode arrays for accomplishing the traveling wave transport apparatus.

U.S. Pat. No. 4,743,926, issued May 10, 1988, discloses a developer or toner delivery system for presenting toner to a charged surface or addressable printhead. Moreover, FIG. 4 therein depicts a toner charging apparatus including a corona charging means (corona wire) and a toner separator for transporting oppositely charged toner particles, one to a print medium and the other being returned to a toner sump.

Fred Schmidlin, "A New Nonlevitated Mode of Traveling Wave Toner Transport", IEEE Transactions on Industry Applications, Vol. 27, No. 3, May/June 1991), where toner particles were disclosed as moving in an aerosol state as tiny linear clouds, with one such cloud confined in the potential trough of each wave.

As evidenced by U.S. Pat. Nos. 5,846,595 and 5,858,099 to Sun et al., hereby incorporated by reference for their teachings, pharmaceutical manufacturers utilize a xerographic like development process to deposit charged pharmaceutical powders on an electrostatic receiver electrode comprised of separated voltage patches. The powder mass per patch is controlled in part by: the area of a patch, the voltage on the receiver electrode and the average charge/mass of the powder particles.

Recognizing the ability to move a large quantity of charged particles with a high degree of control, the present invention seeks to combine novel aspects and improvements of traveling wave transport to provide an efficient and highly accurate method and apparatus for the loading, conveying and dispensing of pharmaceutical compounds (particles) as well as the monitoring and control thereof.

In accordance with the present invention, there is provided an apparatus for conveying electrostatically charged particles to a particle receiver, including: a traveling electrostatic wave conveyor for conveying the electrostatically charged particles from a source at a first end thereof to a receiver at a second end thereof; and barrier electrodes overlaid on said conveyor from the first end to the second end, said electrodes dividing said conveyor into parallel columns and forming isolated potential wells to receive packets of particles therein and to convey said packets to said receiver, wherein the barrier electrodes are connected to a common bus.

In accordance with another aspect of the present invention, there is provided An apparatus for conveying electrostatically charged particles to a particle receiver and estimating the mass of electrostatically charged particles conveyed thereon, including: a traveling electrostatic wave conveyor for conveying the electrostatically charged particles along a surface thereof from a source of particles to a particle receiver; barrier electrodes overlaid on said conveyor in the direction of travel from the particle source to the receiver, said electrodes dividing said conveyor into parallel columns and forming isolated potential wells to receive packets of particles therein and to convey said packets to said receiver, wherein the barrier electrodes are connected to a common bus; and a photodetector directed to receive light reflected from the electrostatically charged particles, wherein the output signal of said photodetector is proportional to the mass density of the particles being conveyed.

In accordance with yet another aspect of the present invention, there is provided a method for extracting charged particles from a fluidized bed of particles and loading the particles on to a traveling wave conveyor, comprising: electrically isolating at least one segment of the traveling wave conveyor; operating the at least one segment of the traveling wave conveyor at a voltage slightly above a corona generating voltage; and immersing the at least one segment within the fluidized bed, where the at least one segment operating above the corona threshold voltage will charge the particles and advance the charged particles to an adjoining segment of the traveling wave conveyor, the segments of which are operated at a voltage below the corona generating voltage.

One aspect of the invention is based on the discovery of techniques for the use and modifications of the electrostatic transport and control means described relative to printing equipment to produce a powder dispensing method and apparatus suitable for the manufacture of oral pharmaceuticals (e.g. tablets, pills, capsules). More specifically, one aspect of the present invention deals with a basic problem in the preparation of pharmaceuticals—the accurate measurement of various components on a mass production scale. Hence, the present invention is directed to a means of dispensing accurately controlled, isolated quantities of powder or particles in the sub-milligram to several milligram mass range.

The techniques described herein are advantageous because they provide a simple, yet highly accurate means for transporting pharmaceutical components or other dry-powder compounds from a source to a receiver. The technique is further suited for automated high volume production and packaging of pharmaceuticals at low cost. Such methods and apparatus make it unnecessary to have expensive weighing equipment. Moreover, the system is flexible enough so as to be applicable to a number of different powder or particulate dispensing situations, and is not limited to pharmaceuticals.

BRIEF DESCRIPTION OF THE DRAWINGS

FIG. 1b is a schematic illustration depicting, in enlarged detail, an aspect of FIG. 1a;

Figure 1A:
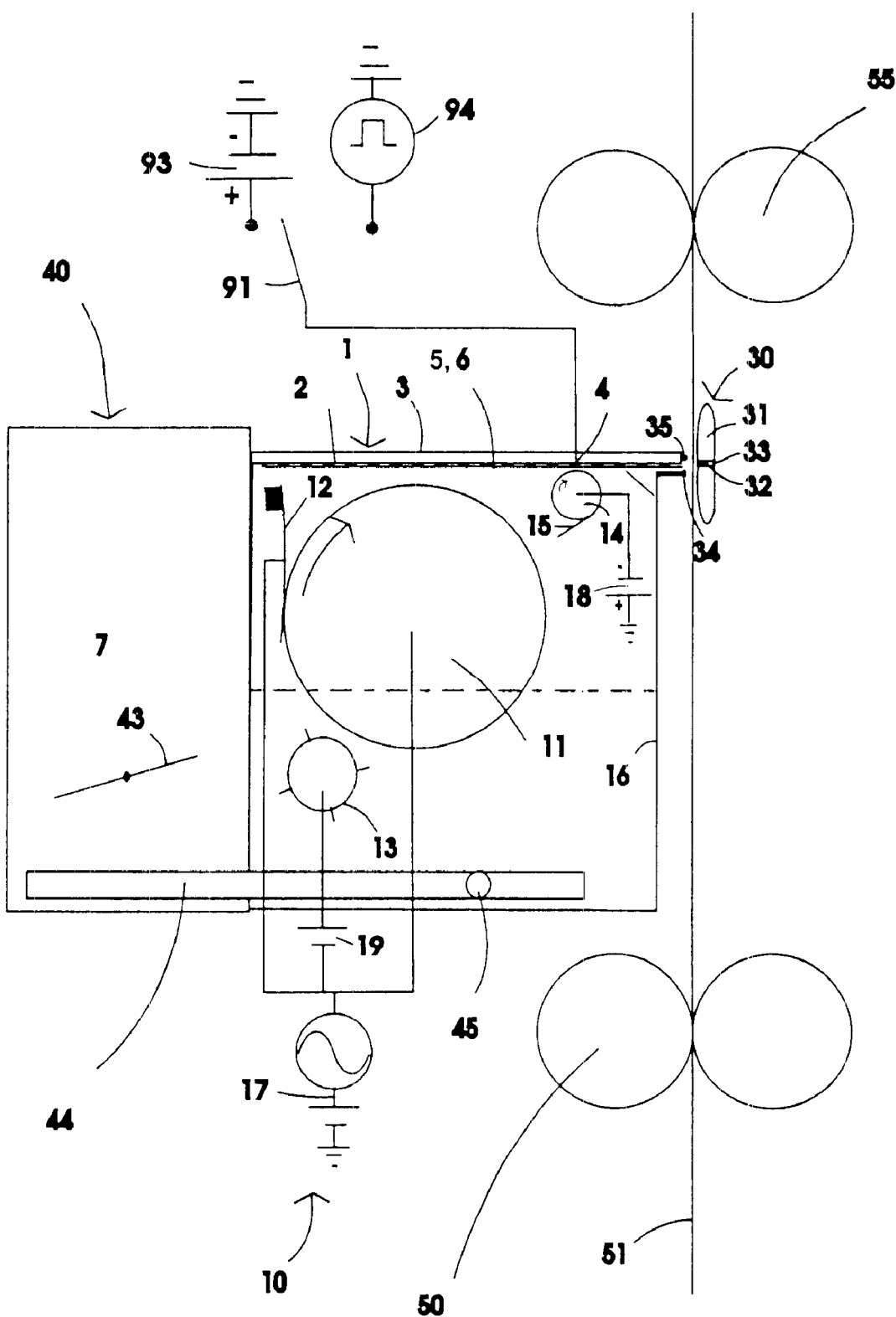
FIG. 1a is a schematic side view of a particle transport apparatus according to this invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

Powder Dispensing Using Traveling Wave Powder Transport

Referring to FIG. 1, the instant invention is directed to the use and modification of an electrostatic transport and control means for printing, described in U.S. Pat. Nos. 5,541,716 and 5,850,587, for the design of a powder dispensing device for the manufacture of pharmaceuticals, including oral pharmaceuticals and the like. More specifically, one aspect of the invention is directed to the accurately controlled dispensing of isolated quantities of powder in the sub-milligram to several milligram mass range. For such an application one powder transport structure is a traveling wave conveyor operating with a wavelength in the 300 to 700 microns range, and flow channels on the order of one millimeter in width. Such a configuration will accommodate high mass flows and ease of fabrication.

Furthermore, conveyors on the order of 500 micron wavelengths have been demonstrated to transport mass-flows in excess of 25 mg/cm-sec. Modulation of the powder flow in multiple channels can be achieved with a single ejector electrode, enabling significant simplification and cost reduction in the manufacture of traveling wave conveyor type dispensers. It is anticipated that the overall structure of a pharmaceutical powder dispensing method and system may be similar to that described in the co-pending application Ser. No. 09/188,458, and as reproduced here as FIGS. 1A and 1B. As will be appreciated, the substrate 51 in FIGS. 1A and 1B becomes a receiver material suitable for assembling and/or packaging the pills. The dispensing system includes "printhead" 1, a particle processing/loading device 10, a receiver focusing electrode assembly 30, a particle supply 40, a particle receiver assembly (not shown) as represented, for example, by sheet 51, a receiver transport means 50. The printhead 1, however, is replaced with a pharmaceutical powder metering device shown schematically in FIGS. 2a and 2b.

Figure 2A:
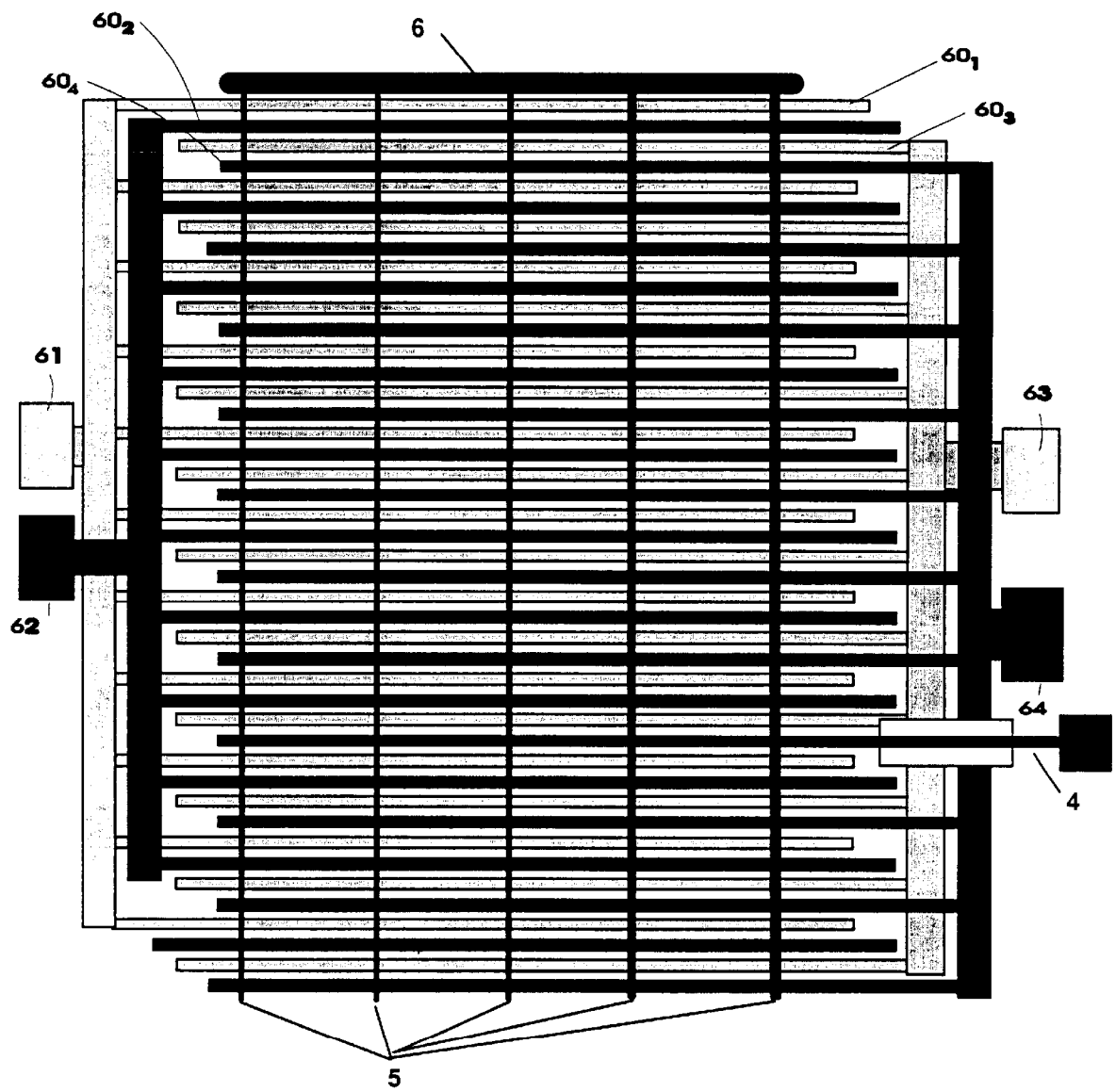
FIG. 2a is a schematic plan view of a traveling wave transport apparatus including an overlay of barrier electrodes on a charged particle conveyor and modulating ejector electrodes.
Figure 2B:
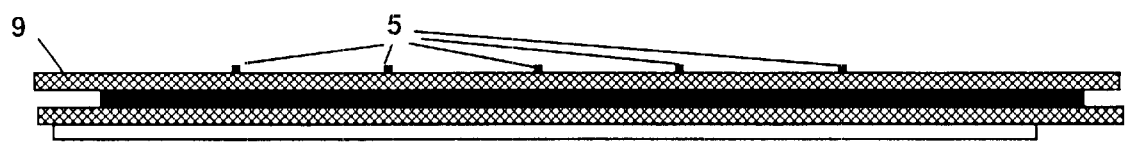
FIG. 2b is a side view of the charged particle conveyor of FIG. 2a, illustrating the relationship between the layers thereof.

Referring to FIGS. 2a and 2b, the powder transport device may be a four phase traveling wave conveyor 60, as previously described, overlaid with an insulating layer 9 and an array of barrier electrodes 5 connected to a common bus electrode 6. Powder flow is modulated, or turned on and off, with the ejector electrode 4. The powder is loaded near the lead edge of the conveyor, opposite the loading device 10 in FIG. 1A. It then travels down the conveyor in channels separated via the barrier electrodes and flows from the end of the conveyor onto a suitable receiver (not shown) such as a sheet, container, etc.

The ejector electrode 4 may simply be a single electrode separated from one phase of the traveling wave grid as indicated. Unlike the barrier electrodes in a toner printing application, the barrier electrodes of the present invention may be larger in size as there is no need for fine channel resolution. Accordingly, the barrier electrodes should have a minimum width of one-eighth to one-quarter of a wavelength of the traveling wave transport. They define the space between powder deposits and can be made to produce the desired spacing between tablets, etc. The larger barrier width makes fabrication easier and assures positive confinement of the powder within the desired transport channels. The channel width (space between the barrier electrodes), typically on the order of several millimeters wide, is chosen to correspond with or produce the desired pill or tablet size.

The simplicity of the above powder dispenser compared to an imaging printhead should be appreciated. The barrier electrodes are much wider and provide effective powder confinement in the channels without any added features such as a uniform field bias plate. The ejector electrode is a normal width traveling wave electrode and experience has shown that this technique works effectively with no detrimental effects on the powder flow.

Powder Flow Monitor and Closed Loop Control System

A highly stable mass flow of known magnitude is an essential and important aspect of a powder/metering device for dispensing pharmaceutical compounds in powder form for pill fabrication at a proper dosage. To measure the mass flow of the conveyance system, advantage can be taken of the fact that the mass flow rate is simply the product of the mass per unit area on the conveyor times the wave speed. Since the wave speed is a constant of the system (frequency*wavelength), the mass flow is readily determined via the mass per unit area in transport on the conveyor.

Furthermore, the mass coverage on the conveyor may be directly determined. The mass coverage is directly proportional to the quantity of light scattered by the powder in transport on the conveyor. In fact, "pictures" of the mass in transport have been recorded with a video camera using a red laser beam shown onto the conveyor surface at a grazing or low-angle of incidence relative to the transport plane.

Figure 3:
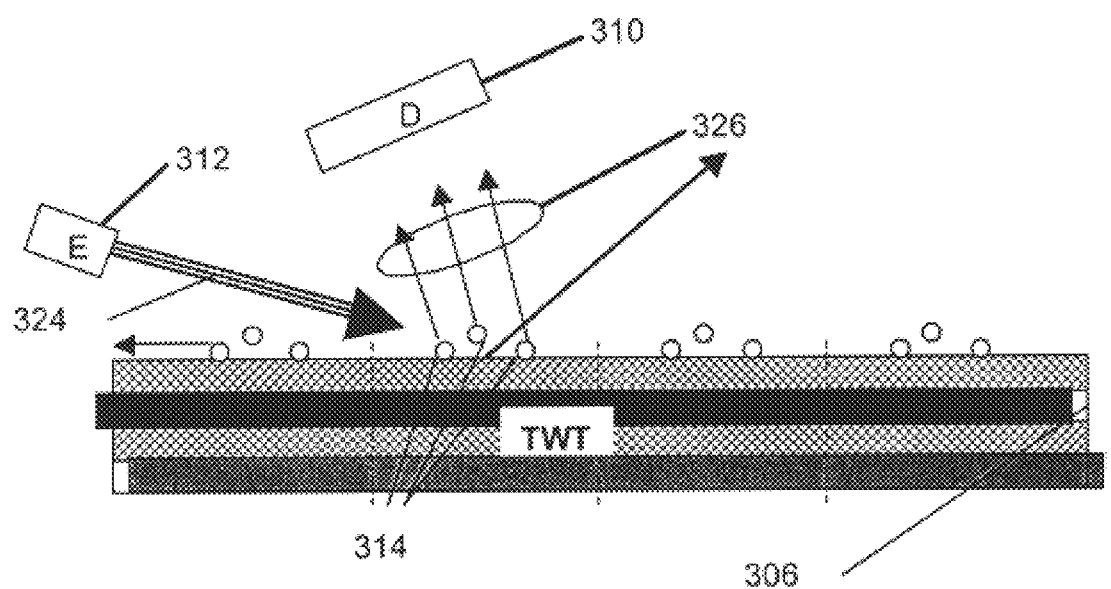
FIG. 3 is a schematic illustration of a mass transport monitoring system in accordance with an aspect of the present invention.

As depicted in FIG. 3, a traveling wave transport 306, having a plurality of particles 314 on a surface thereof, may have an incident beam of light from an emitter (E) 312 directed toward the surface and associated particle cloud. It will be appreciated that a photodetector (D) 310 positioned so as to receive light dispersed or scattered from the particles will only receive that portion of the beam intensity that is scattered from the particles in transport. Accordingly, the "video" signal, or output from any other suitable photodetector, is proportional to the quantity of powder scattering the light. In other words, the more powder present on the surface, the greater the scattered light that is received by the photodetector and vice versa. The output signal can therefore be correlated and calibrated with the mass density in transport. Multiplication of this detected mass density by the wave speed provides an instantaneous measure of the mass flow in transport. Calibration of the sensor to read directly in mass flow can also be achieved by comparing the output signal from the sensor to the mass flow-rate directly measured via a well-established mass flow measurement procedure as described, for example, in "A New Nonlevitated Mode of Traveling Wave Toner Transport" by F. Schmidlin, IEEE Transactions on Industry Applications, Vol. 27, No. 3, May/June 1991), hereby incorporated by reference for its teachings. The photo-signal thus becomes an instantaneous monitor of the mass flow in transport that can be observed and utilized continuously during the powder dispensing process.

Figure 1B:
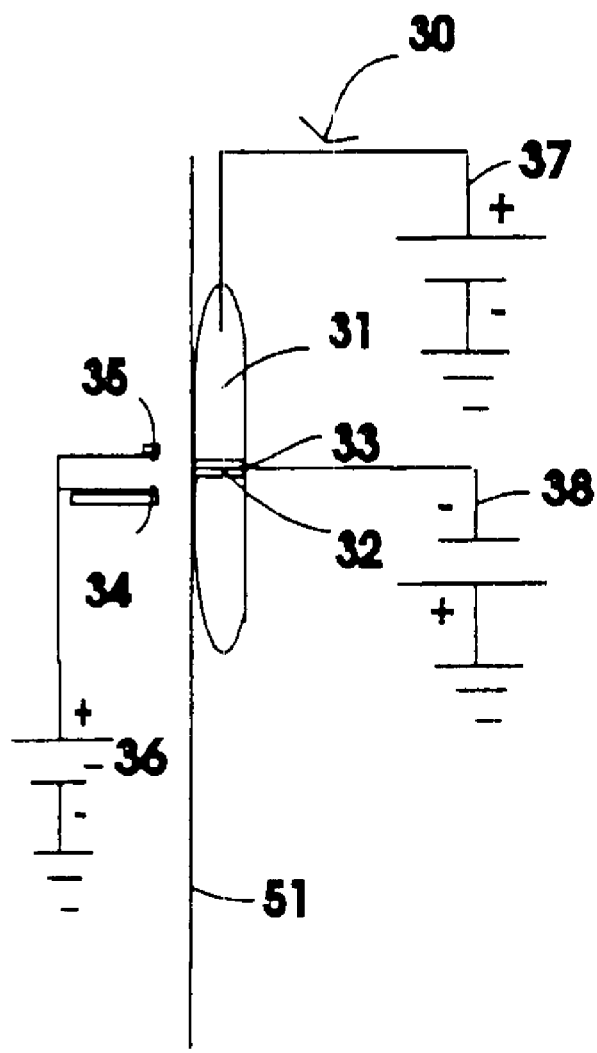

The process of loading toner onto the conveyor generally involves the use of a DC bias voltage to control the conveyor loading rate as represented by reference numeral 17 in FIG. 1A. Control 17 may include a DC biasing means for applying a variable voltage to an electrode adjacent the particle source. The DC bias controls the conveyor rate at which particles are loaded on the conveyor. DC bias control circuit 17, receives an output signal from the photodetector and, in response to a comparison of the photodetector output signal to a preferred signal level, the control circuit adjusts the DC bias voltage.

In a further improvement, the output from the above monitor can be fed into a control circuit to continuously adjust the conveyor powder loading rate and thus provide a closed loop control system for stabilizing the powder flow rate on the conveyor. With a stabilized flow rate the quantity of powder deposited on the receiver sheet to form a single pill can be accurately controlled via timing the flow duration to a single tablet area. Alternatively, it should be noted that the powder carried by a single wave, called a powder packet, may be computed from the mass flow rate and wave frequency. The powder in one packet is thus quantified and the amount of powder deposited in one tablet can be determined by counting the number of contributing waves. The number of contributing packets plus any fraction of one packet is controlled via voltage pulses applied to the ejector electrode.

It should be stressed that this control method is dependent on the measured powder mass only and is independent of the charge on the powder particles. Of course, the charge on the powder particles is critical to their being loaded onto the conveyor, but the sensor detects only those particles successfully loaded onto the conveyor. The previously described, closed-loop control method will automatically compensate for any charge variation on the individual particles. Only the mass deposited is controlled and it is only the mass per tablet that is important medically. The proposed technique therefore stabilizes the one and only quantity of critical importance to the powder-dispensing device.

A Simple Electronically Controlled Conveyor Loading Device

Figure 4:
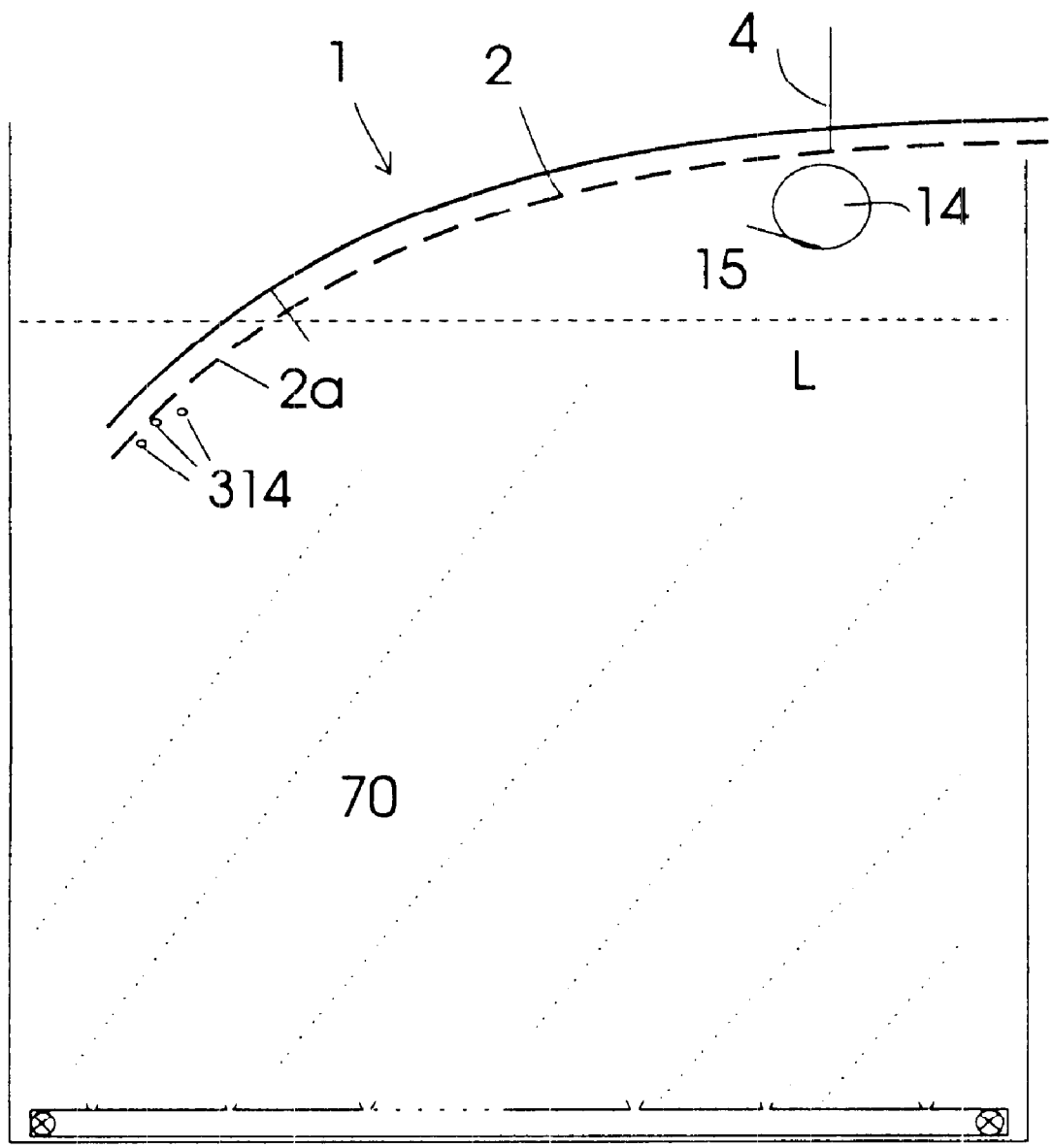
FIG. 4 is a schematic illustration of an aspect of the present invention directed to extracting charged particles from a fluidized bed for transport.

The fluidization of powders is a well-known art. Reference is made to U.S. Pat. No. 5,850,587 to F. Schmidlin, issued Dec. 15, 1998, where FIG. 4 illustrates a fluidized bed and a transport with corona charge loading of the transport. However, a novel method for extracting powder from a fluidized bed and loading it onto a traveling wave conveyor is to electrically isolate a lead segment of the traveling wave conveyor and operate it at a voltage slightly above the threshold for corona generation. Referring to FIG. 4, if lead segment 2a of the traveling wave conveyor 2 is immersed in the fluidized powder bed 70, it will charge the powder particles 314 and send them onto adjoining segments of the traveling wave conveyor 2 operated at a normal voltage level—i.e., below the corona threshold.

A corona generated by the lead segment 2a will produce particles of both positive and negative polarities. This opens a number of opportunities for transporting either bi-polar or mono-polar powder particles. Bi-polar powder particles can be advantageous for tablet fabrication because large deposits can be made without hindrance from space charge effects as such charges would be neutralized as a result of the bi-polar particles deposited. It should be recognized that the particles of the two polarities would separate on a traveling wave and move along the conveyor a half wave apart from one another. It will thus be possible to measure the flow of both polarities combined or individually. Thus, the flow modulating method and apparatus described above must be operated in a manner so as to accommodate the powder polarity reversal during each half wave. Electronic operation of the modulator voltage to reverse the extractor fields with the appropriate timing involves techniques well known it the art of electronics (e.g., a switching power supply timed to the traveling wave transport frequency). Alternatively, it is possible to simply extract one polarity of powder from the conveyor and return it to the fluidized bed before it passes to the modulation and deposition zones of the powder dispensing device. Techniques for handling the different particle polarities are believed to be evident to anyone skilled in both electronics and electrostatics.

In recapitulation, the present invention is a method and apparatus for employing a traveling wave transport for the conveyance and metering of pharmaceutical and other particulate compounds in manufacturing operations. In particular, the present invention includes not only an embodiment of a traveling wave transport, but also monitoring methods and apparatus to sense the particle mass being transported, and an apparatus for controlling the mass per unit area (density) of particles being loaded onto the transport apparatus.

It is, therefore, apparent that there has been provided, in accordance with the present invention, a method and apparatus for traveling wave transport of charged particles, and more particularly to methods and apparatus for the loading, conveying and dispensing of particles as well as the monitoring and control thereof. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for conveying electrostatically charged particles to a particle receiver, including:
   a traveling electrostatic wave conveyor for conveying electrostatically charged particles of a pharmaceutical compound from a source at a first end thereof to a receiver at a second end thereof; and
   barrier electrodes overlaid on said conveyor from the first end to the second end, said electrodes dividing said conveyor into parallel columns and forming isolated potential wells to receive packets of pharmaceutical compound particles therein and to convey said packets to said receiver, wherein the barrier electrodes are connected to a common bus.

2. The apparatus of claim 1, further including:
   a measurement device for characterizing the mass of particles traveling in a packet.

3. The apparatus of claim 2, wherein said measurement device includes:
   a light source emitting an incident beam of light directed toward a surface of the conveyor and associated particle packets traveling thereon;
   a photodetector positioned to receive light reflected only from particles on the conveyor, wherein the incident beam is reflected away from the photodetector by the conveyor surface, so that an output from the photodetector is proportional to the quantity of powder scattering the light.

4. The apparatus of claim 1, wherein said traveling electrostatic wave conveyor is a four phase traveling wave conveyor overlaid with an insulating layer, and where said barrier electrodes are connected to a common bus electrode.

5. The apparatus of claim 4, further including an ejector electrode for modulating the powder flow by controlling the amount of powder loaded near a lead edge of the conveyor.

6. The apparatus of claim 1, further including means for extracting powder from a fluidized bed and loading it onto the traveling wave electrostatic conveyor by electrically isolating a lead segment of the conveyor and operate said lead segment at a voltage slightly above the threshold for corona generation.

7. The apparatus of claim 1, wherein said apparatus is employed to transport bi-polar particles, and where particles of each of two possible polarities would separate on a traveling wave and move along the conveyor a half wave apart from one another, such that dose collection and tablet fabrication may proceed without hindrance from space charge effects of the particles.

8. An apparatus for conveying electrostatically charged particles to a particle receiver and estimating the mass of electrostatically charged particles conveyed thereon, including:
   a traveling electrostatic wave conveyor for conveying the electrostatically charged particles along a surface thereof from a source of particles to a particle receiver;
   barrier electrodes overlaid on said conveyor in the direction of travel from the particle source to the receiver, said electrodes dividing said conveyor into parallel columns and forming isolated potential wells to receive packets of particles therein and to convey said packets to said receiver, wherein the barrier electrodes are connected to a common bus; and
   a photodetector directed to receive light reflected from the electrostatically charged particles, wherein the output signal of said photodetector is proportional to the mass density of the particles being conveyed.

9. The apparatus of claim 8, further including:
   a DC biasing means for applying a variable voltage to an electrode adjacent the particle source, wherein the DC bias controls the conveyor rate at which particles are loaded on the conveyor; and
   a DC bias control circuit, wherein the output signal of said photodetector is received as an input and, in response to a comparison of the photodetector output signal to a preferred signal level, the control circuit adjusts the DC bias voltage.

10. A method for extracting charged particles from a fluidized bed of particles and loading the particles on to a traveling wave conveyor, comprising the steps of:
    electrically isolating at least one segment of the traveling wave conveyor;
    operating the at least one segment of the traveling wave conveyor at a voltage slightly above a corona generating voltage; and
    immersing the at least one segment within the fluidized bed, where the at least one segment operating above the corona threshold voltage will charge the particles and advance the charged particles to an adjoining segment of the traveling wave conveyor, the segments of which are operated at a voltage below the corona generating voltage.

11. The method of claim 10, further comprising the step of applying a DC bias voltage to control the conveyor loading rate.

12. The method of claim 11, further comprising the steps of:
    monitoring the output of a photodetector positioned for sensing light reflected from a surface of the charged particles on the traveling wave conveyor;
    feeding the output of the photodetector into a control circuit, wherein said control circuit is adapted to continuously adjust the traveling wave conveyor powder loading rate and thereby control the powder flow rate on the traveling wave conveyor.

13. The method of claim 10, further comprising the step of controlling the quantity of powder deposited on a receiver, to form a single dose, by controlling the time of flow duration thereto.

14. The method of claim 10, further comprising the steps of:
    characterizing as a powder packet, the powder carried by a single wave on the traveling wave conveyor, wherein the packet mass may be computed from the mass flow rate and wave frequency of the traveling wave conveyor; and
    quantifying the amount of powder deposited in one dose by counting the number of waves contributing thereto.

15. The method of claim 14, further comprising the step of:
    controlling the number of contributing packets to any particular dose using voltage pulses applied to an ejector electrode in proximity to the fluidized bed.

* * * * *